INVENTOR
JOHN A. RANKIN
BY
Kane, Dalsimer, Kane & Smith
ATTORNEYS

INVENTOR
JOHN A RANKIN
BY
Kane, Dalsimer, Kane & Smith
ATTORNEYS

Feb. 24, 1970 J. A. RANKIN 3,497,633

MULTITRACK ELECTROMAGNETIC TRANSDUCER HEAD WITH CROSS FIELD POLE

Filed June 21, 1966 5 Sheets-Sheet 3

INVENTOR
JOHN A. RANKIN
BY
Kane, Dalsimer, Kane & Smith
ATTORNEYS

INVENTOR
JOHN A. RANKIN
BY
Kane, Dalsimer, Kane & Smith
ATTORNEYS

INVENTOR
JOHN A. RANKIN
BY
Kane, Dalsimer, Kane & Smith
ATTORNEYS 3,497,633

MULTITRACK ELECTROMAGNETIC TRANSDUCER HEAD WITH CROSS FIELD POLE

John A. Rankin, St. Joseph, Mich., assignor to V-M Corporation, Benton Harbor, Mich., a corporation of Michigan Filed June 21, 1966, Ser. No. 559,178
Int. Cl. G11b 5/12
U.S. Cl. 179—100.2 1 Claim

ABSTRACT OF THE DISCLOSURE

A multitrack magnetic transducer having a cross field pole extending across all of the gaps of the transducer. The cross field pole is adjustably positioned across the gaps by a three-point support means.

This invention relates to apparatus for recording and reproducing messages having broad frequency spectrums, such as signal series representative of television, upon or from a magnetic recording media.

The magnetic recording art has constantly striven for methods and apparatus for recording wider and wider frequency spectrums of signals for later reproduction. As the recording and reproducing processes are improved in fidelity, more information, and information of a wider variety of contents, can be successfully stored on magnetic tape. Storage of information such as television signals on magnetic tape is extremely desirable. It is economical. Further, one of the great advantages is that of its being immediately reproducible. Still further, through the mechanism of erasure of the tape the process has the advantageous unique characteristic of reusability of the recording media.

One of the attractive uses for wide spectrum magnetic recording is the recording of television signals which have substantial frequency spectrums. Television channels are allocated a band width of 6 megacycles with the video signal information occupying a substantial portion thereof. It is well recognized in the art that in order to record satisfactorily and to reproduce higher and higher frequencies, or shorter wave length, the magnetic transducer incorporating a gap arrangement whereat recording occurs must be smaller and more accurate, and that in order to record satisfactorily and with high fidelity a broad band of frequencies occupying a wide spectrum which includes low frequencies, as well as high frequencies, the point at which recording occurs and the width of the effective recording gap must be improved for the high frequency performance without impairing that for the low frequency performance. It is particularly to this phase of recording that this invention is directed.

Many proposals have been made in the past to achieve a high degree of fidelity in recording with various arrangements of head structures. Improvements have also been made through the development of better tapes. However, full advantage cannot be taken of such advances unless the head structures are improved. One of the principal ways tried for this purpose has been through the design of head structures wherein the gap distance between the pole tips is made smaller and smaller. As so often happens in such advances in the art, the defects of other parts of the apparatus normally used become more and more noticeable.

One of the primary problems is that with the decrease in spacing between the pole tips of the recording head the head itself may saturate during the recording operation at levels below that at which the tape would saturate. Then, during playback, the head output is low. It is known also that most of the recording action takes place in the field strength range of between 300 and 225 oersteds. This gives rise to the conclusion that below some value, such as 225 oersteds, the field is too weak to have any significant influence on the recording medium. The trend in design is to provide recording mechanisms through the use of which the field may be strengthened so that the uppermost portion of the record strip will be fully magnetized.

For most recording operations a high frequency bias is used for linear recording. With such control the bias so acts that whatever recording takes place on one half-cycle of the bias is canceled on the on the opposite half-cycle. The overall effect is that the permanent recording takes place on the record strip at a location somewhat beyond the gap and over a distance within which the field strength is that to which the strip is sensitive. Where a recording signal is in the range to which there is a significant sensitivity the signal acts as a bias. Its first effect is that of giving some magnetism to the strip just prior to its entry above the gap between the pole tips. However, as the gap is approached the cyclic field of the bias is effective and this produces an effect strong enough to cancel any previous recording effect that may have been introduced. Any previous recording is thus obliterated.

Consequently, it is only after the recording medium is moved or transported beyond the gap between the pole tips that it is possible to provide a permanent record of the modulation applied to the magnetic pole elements. This is due to the fact that as the record strip leaves the position of the gap the effect of the bias becomes less and less and each positive half-cycle is lightly stronger than the following negative half-cycle for signals having a positive potential. The result is that each positive half-cycle of the bias contributes some magnetism to the record strip, which effect is not canceled. When the position at which this effect occurs is determined, it is found that although the zone where recording takes place is relatively small it is much larger than desired if high frequency information is to be stored. Also, it is at a considerable distance beyond the gap, measured in the direction along which the magnetic recording medium is being transported. The zone over which the recording occurs is not abrupt. It tapers off. The significance of a finite zone is particularly noticed when the frequencies being dealt with are such that with the frequency increasing the wave length becomes shorter and shorter and then finally approaches the length of the critical zone.

If provisions can be made to reduce the length of the critical zone over which recording can occur it is apparent that the frequencies which can be recorded can be higher and higher. This is particularly important when the extremely high frequencies that must be dealt with in television are considered. One of the early proposals for establishing a substantial reduction of the zone over which recording can occur was made some time ago by Camras, who proposed a structure in which a cross-field head was used to develop a vertical component of magnetism for superposing upon the normal substantially semi-circular field pattern at the head gap. The effect was to produce a net field effect which insured a more rapid decay of the field at the trailing edge of the gap and which, at the same time, tended to provide a more uniform intensity through the thickness of the magnetic coating on the record strip itself.

In theory, the proposal was sound. The problem was, and, has been, that it was not accompanied by any real practical solution of a structure by which the theory could be practiced or the desire achieved.

The problem has existed for many years. Camras made his proposal more than fifteen years ago. Even despite the need for a practical solution for carrying out the method it has been lacking for at least fifteen years. The need for a practical answer cannot be overlooked. Particularly when it is borne in mind that many workers in the field have sought a practiced answer without success, notwithstanding the fact that the number of television stations in use is rapidly increasing and the number of receiving sets is increasing annually by order of millions. The need for a practical means to record the signal frequencies in the most efficient and economical way possible thus becomes greater and greater.

In the first instance, it had been proposed to develop a cross-field micro-gap head to improve the operation. The main recording head normally positions its pole tips within a distance of the order of only a few millionths of an inch. These pole tips have a width transversely of the direction along which the recording medium is moved relative to the recording head which, illustratively, is about 0.016″, which, compared to the spacing, is substantial. It is essential that there be precise control over the parallelism in the spacing between the pole tips for recording. There should be a similar degree of control over the spacing and positioning of the element to develop the cross-field if there is to be the degree of compensation which will make the cross-field unit a commercially usable piece of apparatus. To achieve the results which Camras proposed it would be necessary to reduce the mechanism to a tolerance of some $10\times10^{-6}$ (that is, ten-millionths) of an inch. This is a commercial and practical impossibility. Although when viewed in one dimension the theoretical wedge between the field strength of the cross-field and the main field may at first appear feasible the desired gap sides and the cross-field pole must all be precisely parallel if the desired end-result is to be realized. Some track width cannot be avoided. Consequently, unless the structure is correctly and accurately set up degradation of the high frequency response is inherent and naturally results. Many serious problems of phase shift between low and high frequencies are also experienced, to the detriment of any reproduced record. The end-result has been that the Camras idea, while appearing to be theoretically sound, has not been realized in practice for television frequency bands. Applicant believes this is due to the impossibility of obtaining the required head adjustment, precision of manufacture and the positioning needed to solve the problem intended.

The present invention, accordingly, seeks to solve by simple apparatus the problems which have so long been prevalent in the prior art. It provides a head structure which substantially eliminates the problems of parallelism, which undoubtedly confronted Camras and other workers in the field. It also seeks to provide a more efficient recording device for high frequency signals which is simple in its construction, which can be assembled by other than the most expert in the field of its use, which will not be readily subject to misalignment after installation, and which will provide an improvement in the art which insures many times the recording stability of structures heretofore used and contemplated.

In the form in which the invention herein is practiced, a magnetic tape or record strip is transported across an extremely narrow gap established between the tips of two pole pieces. Winding coils are wrapped around the pole pieces to create a magnetic field between the pole tips when the coils are energized. Bias plus signal current is applied through the winding and results in the development of a magnetic flux through the tips of the pole pieces. The windings are connected in aiding fashion and with an application of a biasing voltage in the form of a relatively high frequency A.C., plus information supplied thereto as a signal current. The aim is to create a magnetization of a record strip transported across the gap. The recorded signal can be reproduced at a later time by suitable pick-up heads. The present invention utilizes the cross-field created by a pole tip positioned above the gap between the pole-piece tips with the transported magnetic tape being adapted to move over the tips of the pieces and between them and the cross-field creating pole tip. The cross-field tip is surrounded by a winding to which only a bias frequency of correct polarity and phase is supplied. The produced field functions as a bucking field on the field strength created across the gap between the pole piece tips. The field created is such that the recording on the record strip occurs following its passage past the gap at the pole piece tips with the recording zone being very accurately controlled and defined. The result is to narrow very greatly the linear distance over which the recording can occur after the transported record strip passes the pole tip gap.

A return field path for the cross-field pole may be created by providing one or more additional extending pole pieces at either or both sides of the cross-field tip, with the return path then being provided through the recording pole pieces. On the other hand, the return field may be by way of an air return path which functions in essentially the same way.

The effect resulting is that by the developed cross-field, the distance from the edge of the gap and the pole tip last traversed by the record strip is substantially reduced and the zone over which recording is effective within the assumed range of between 225 and 300 oersteds is very markedly changed and reduced.

The invention has been illustrated in certain of its preferred forms by the accompanying drawings in which FIG. 1 is a schematic representation of the invention wherein a cross-field pole with two return arms positioned above and closely adjacent to a record strip adapted to be moved over the gap between the tips of two adjacently positioned pole pieces to which both bias and signal energy are applied;

Figure 5:
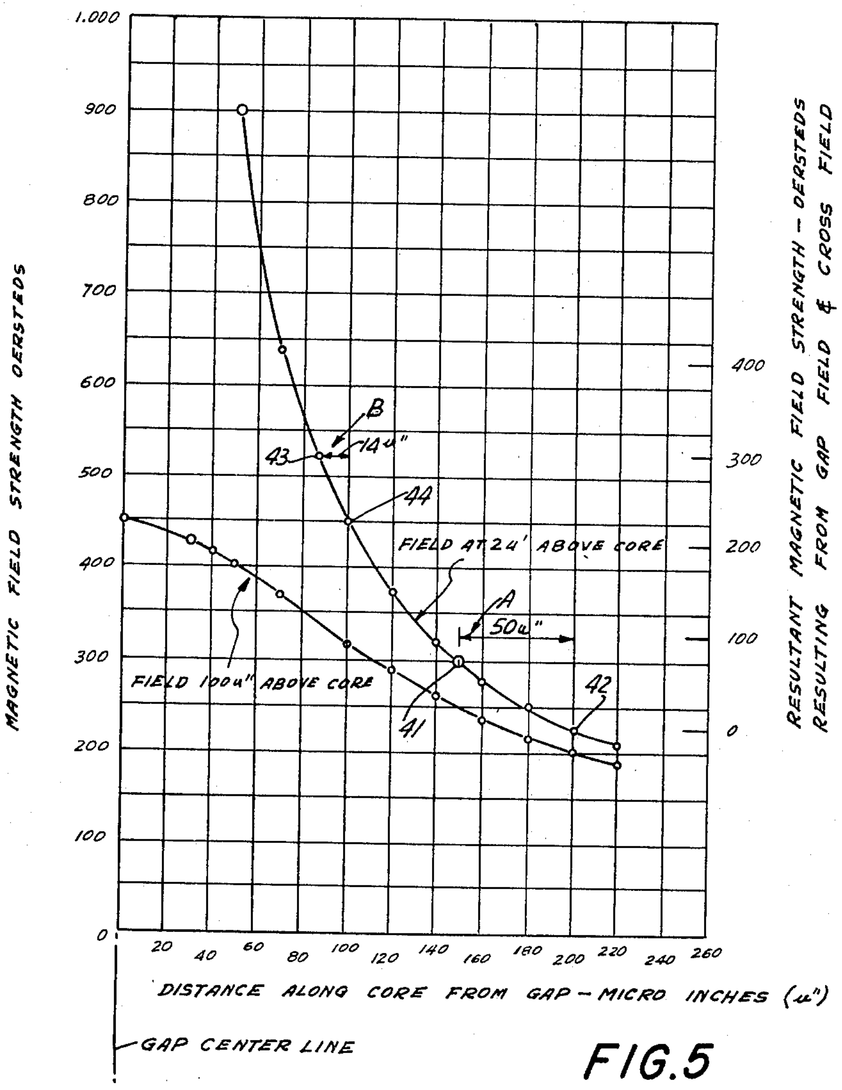
Figure 9:
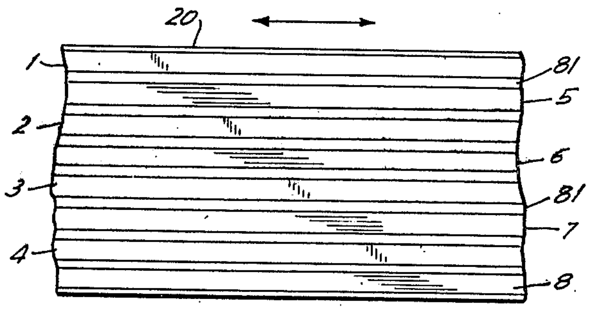
Figure 6:
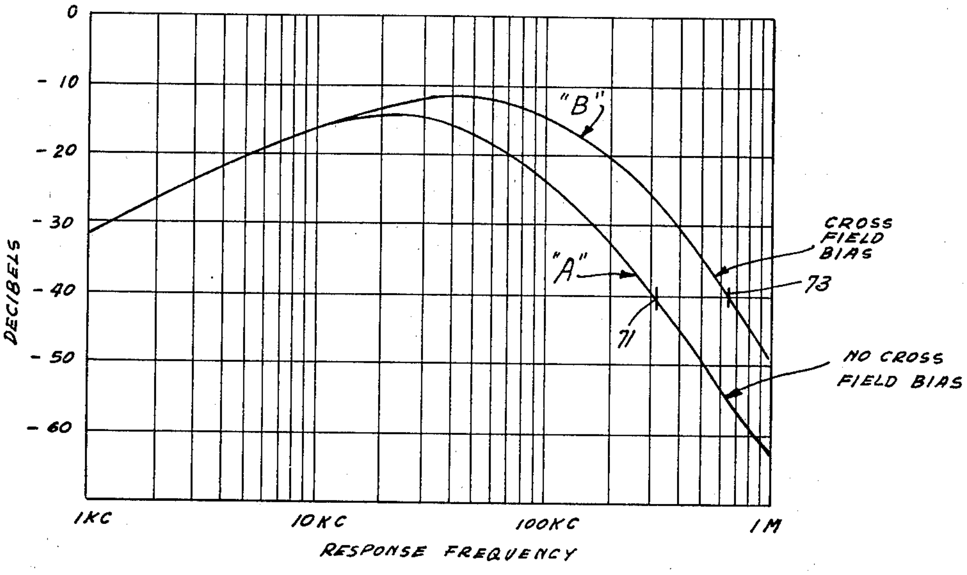
Figure 7:
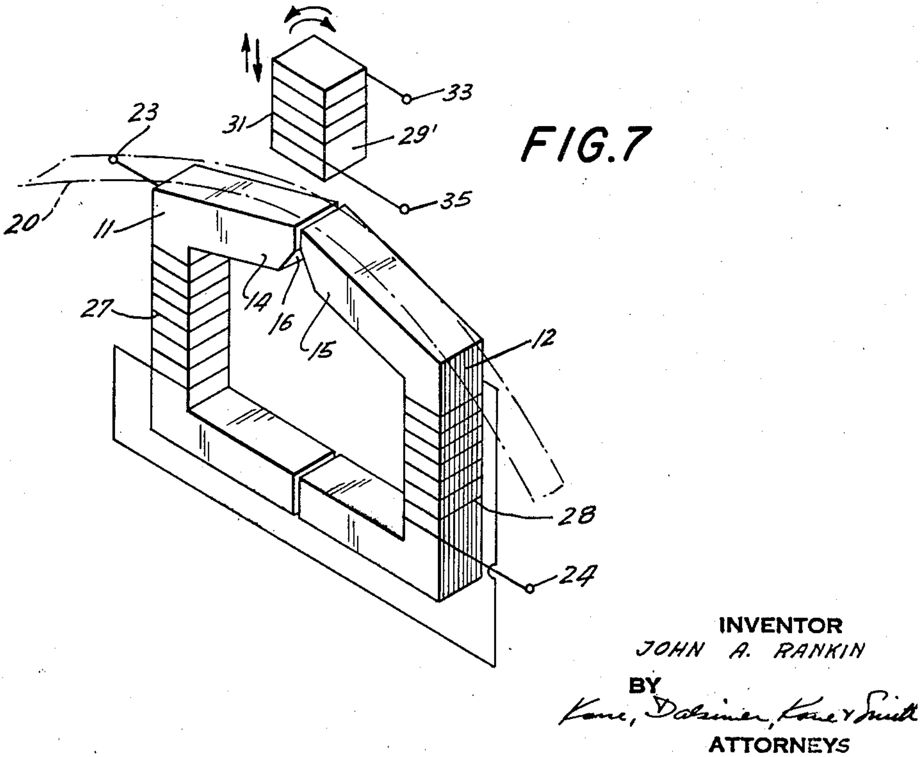
Figure 8:
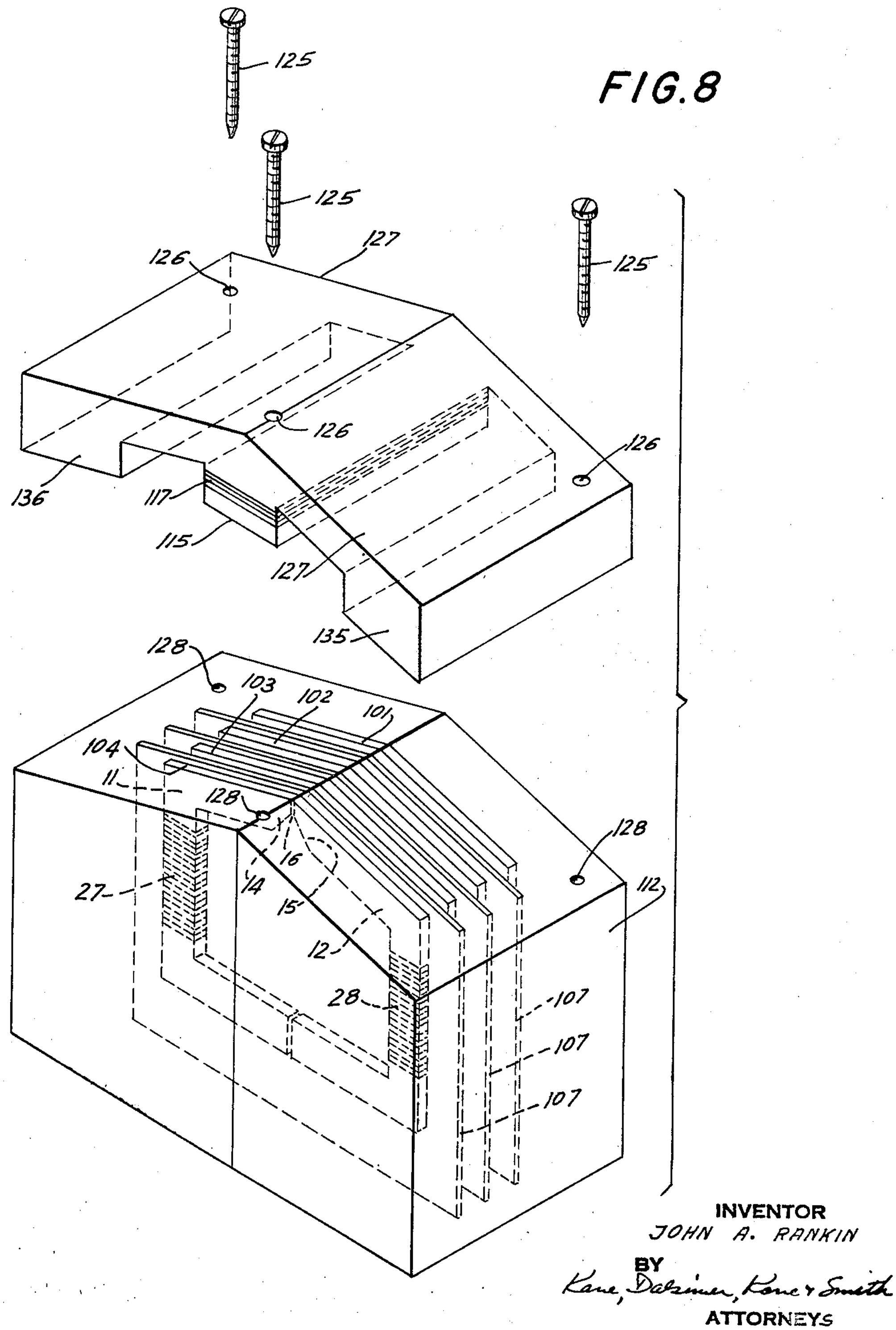
Figure 10:
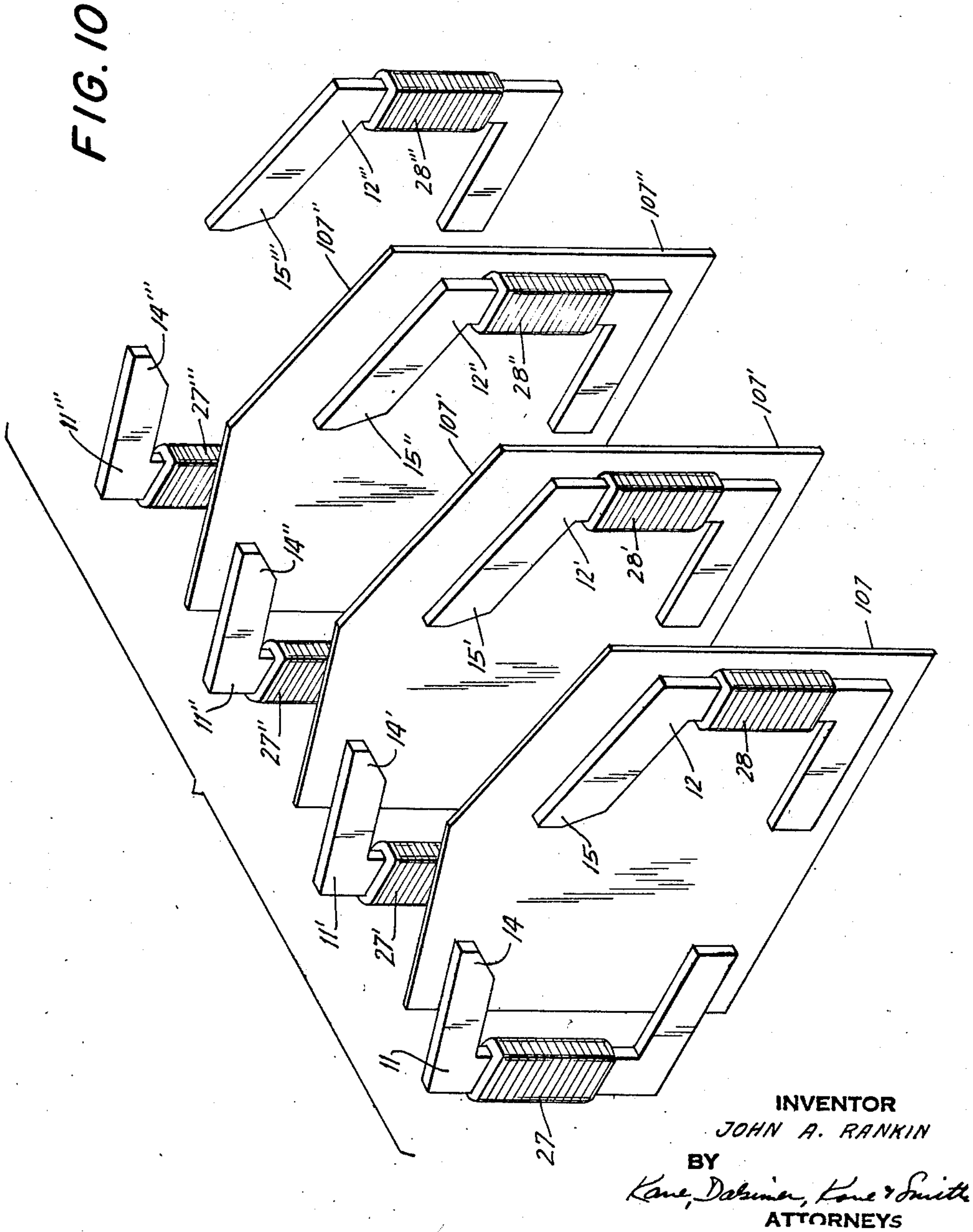

FIG. 5 is a curve to depict the improvement obtained through the use of the cross-field during the recording operation and showing particularly the relationship between the recording fields and the distance along the pole pieces at which the fields become effective with the field strength above the pole pieces plotted as the ordinate and the distance along the pole pieces plotted as the abscissa and showing the loci of different field strength points within the range of 300 and 225 oersteds;

FIG. 6 is a graph showing the output voltage from a recording head as dependent upon an input signal of constant current and at a signal frequency presumed to give equal magnetization at all frequencies. By this graphic showing, the lower curve represents a condition where no cross-field bias is used; the upper curve represents a condition where cross-field bias is applied. The curve shows the output levels for different frequencies plotted to vary between zero and −60 db, as shown by the ordinate designations, with the abscissa designations showing response frequencies plotted logarithmically;

FIG. 7 is a schematic showing generally in isometric arrangement to show the positioning of the magnetic head with respect to the transported record medium and the cross-field developing pole;

FIG. 8 shows a modification of the head construction where a multiplicity of independent tracks may be simultaneously recorded. This figure is a schematic isometric showing on a greatly enlarged scale and pictured for reasons of clarity as an exploded view with the record medium adapted to be transported across the heads omitted for reasons of clarification;

FIG. 9 is a greatly enlarged schematic view of a section of a typical record medium upon which a multiplicity of tracks of information may be simultaneously recorded; and FIG. 10 shows an exploded isometric pattern of two pairs of recording heads for multiple track recording. It is to be noted that in this connection, a modification, the cross-field developing pole has been omitted for reasons of clarification.

Figure 1:
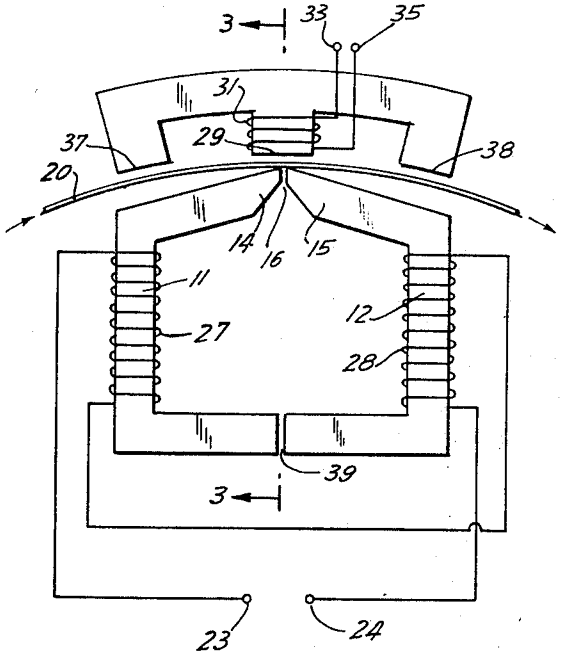
Figure 2:
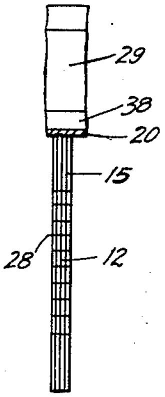
FIG. 2 is an end view of the assembly of FIG. 1 looking from right to left.
Figure 3:
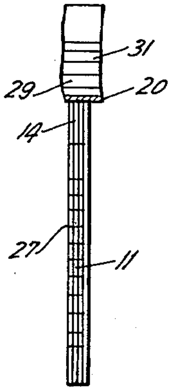
FIG. 3 is a sectional view on the line 3—3 of FIG. 1.

First, making reference to FIG. 1, and the related end and sectional view of FIGS. 2 and 3, of the accompanying drawings for a further understanding of the invention, two pole members 11 and 12 are shown. The pole members have tips 14 and 15, respectively, which are normally reduced in area as compared to the pole members. The tips approach each other very closely and are separated by an extremely small gap area designated at 16. This gap width is normally about in a range of $10 \times 10^{-6}$ inches ($\frac{1}{1000,000}$ inch) with the head width being about that of the track which it is desired to record. Assuming, for instance, that the record tracks will be recorded on a record strip which is only about one-quarter (¼) inch in width, each track width may be approximately 0.016 inch, providing space for several adjacent tracks. The magnetic tape or record strip 20 upon which a magnetic record is to be formed is transported in any desired manner (not shown) to move it at approximately constant speed relative to the gap between the pole tips. The coating on the underside of the record strip or tape 20 is usually of a thickness of about 150 microinches ($\mu''$). The total tape thickness is about 0.001 inch and the separations between each track is normally approximately 0.009 inch, as one example.

With recording operations taking place biasing voltages accompanied by input signals are applied (from any desired source which is not here shown) to the input terminal points 23 and 24. The applied relatively high frequency currents are fed through the indicated conductors and the windings 27 and 28 produce a magnetic flux between the pole piece tips 14 and 15. This flux is made effective in the record strip 20, it being understood that windings 27 and 28 are connected in aiding fashion.

A cross-field is created by the pole tip 29 which is surrounded by a winding 31 which leads to a pair of input terminals 33 and 35. Only the bias frequency is applied at terminals 33 and 35. This bias frequency must be of the correct polarity and phase to create, when applied, a truly bucking field which acts in subtracting relationship to the field between the poles in the region beyond the gap between the pole pieces in the direction of tape or medium travel.

The field which is created at the sides of the gap, namely to the right or to the left, is determined by the polarity of the cross-field originating from the winding 31. This field is made to buck the external field from the pole piece tips 14 and 15 relative to the pole tip 29. By a control of the applied phase the side of the gap, that is to the right or to the left, is determined by the polarity of the cross-field. It can be made to buck the external field from the pole piece tips 14 and 15 to the right of the gap which would be suitable for recording on a magnetic record strip when the record strip is drawn over the pole pieces from left to right. On the other hand, it can also be made to buck the left-hand side of the gap so that the record strip may be moved from the right to the left across the pole pieces.

The bias is applied to the terminals 33 and 35 to develop the field from the pole piece 29 through the winding 31. The developed magnetic flux which flows outwardly from the pole piece 29 returns via the pole pieces 37 and 38 which are on the same side of the record medium or tape 20 as the pole piece 29. These pole pieces 37 and 38 are arranged generally adjacent to the pole pieces 11 and 12 as indicated.

Referencing the showing of FIG. 1 to companion FIGURES 2 and 3, it will be seen that the heads have a reasonable width (that of the tracks to be recorded, as in FIG. 9). It is important from the standpoint of providing a cross-field which shall have the proper effect that there shall be substantial precision of the adjacent surfaces of the pole pieces 11 and 12 and their tips 14 and 15, as compared to the pole piece 29. The structure provided by the FIGS. 1 and 7 arrangement is one which, from the manufacturing viewpoint, makes it possible to develop an extremely precise surface, and by a very low cost manufacturing procedure to develop an extremely flat surface for the pole piece 29. The problem then remaining is that of mounting the pole pieces 11 and 12 relative to the pole piece 29 so that all are aligned in parallel relationship with high precision. Each of the pole pieces in the described structure is strictly independent of the other, both physically and electrically, so that adjustment of one pole piece relative to the other becomes relatively easy. Pole pieces 11 and 12 may be turned and adjusted relative to each other by reason of the separation as provided at 39 between the two portions. Pole piece 29 has already been described as separate. It is desirable to mount the separate pole pieces in supports (see FIG. 8 which will later be discussed in some detail) so that while in one arrangement they may be securely clamped and adjusted essentially with micrometer precision they are nonetheless generally free from each other. This permits of a precision of a form not heretofore realized in the art.

The pole piece 29 is made parallel to the pole pieces or tips 14 and 15 thereby to produce a field that is uniform throughout the length of the gap or gaps (as the case may be) between the pole pieces 14 and 15. A parallelism in the area perpendicular to the exposed surfaces of the pole tips 14 and 15 and the cross-field pole field 29 theoretically produces a field that is uniform across these pole tips. It is the uniform field that is particularly important because it is from this that the recording areas with each increment of flux information throughout the thickness of the poles (that is the length of the gap) are separated from the gap by the same physical distance resulting from a uniform field.

As previously defined, the reason for the precision adjustment of pole piece 29 with respect to pole tips 14 and 15 is to create parallelism between the face surface of pole 29 and the surface of pole tips 14 and 15 adjacent to the tape in order that the resulting cross-field is exactly uniform across the gap 16. Since the purpose of pole pieces 37 and 38 is provided only for a return path for the magnetic flux, the spacing between the surfaces of 37 and 38 and pole pieces 11 and 12 is relatively unimportant since they have greater area and hence the flux through the tape at this point is below the point at which it can affect the magnetization remaining in the tape. For the foregoing reasons pole pieces 37 and 38 are not strictly essential to the operation, as can be appreciated from the showing of FIG. 4 where an air gap return is utilized.

Figure 4:
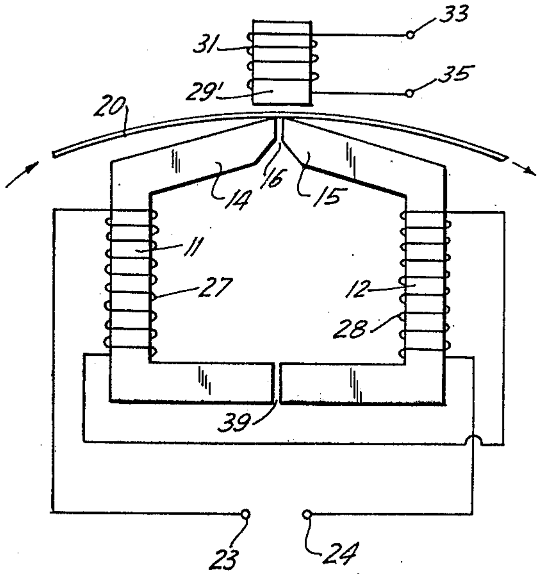
FIG. 4 is a view generally similar to FIG. 1 with the cross-field pole shown with an air path return.

If reference is made to FIG. 4, components of like character to FIG. 1 are designated by like numerals. The single pole piece 29' functions in the fashion of pole piece 29 of FIG. 1 and has only the biasing voltage applied thereto from terminals 33 and 35. The cross-field developed functions in the same fashion as already explained in connection with the structure shown by FIG. 1.

With the foregoing in mind, reference may now be had to FIG. 5 which is a graph showing the external field of a normal recording head plotted against the distance from the gap parallel to and along the core in the tape path for two different vertical distances from the core to give the graphic representation of the general effects of the recording process. These curves indicate the field effect upon a particle at a distance of 100 $\mu$in. above the core or gap at various distances from the core center to move them 200 $\mu$in. from the gap parallel to the core. It has already been mentioned that for field strengths in cases of about 300 oersteds, all particles in the tape are reversed at each half cycle, whereas when the field strength becomes less than about 225 oersteds, none of the particles is reversed for similar conditions.

Under the circumstances and directing attention to FIG. 5, if one considers what happens to a particle on the record strip or tape which is at point 0 on the abscissa, (i.e., at the center of the gap) it is clear that for a particle that is 2 μin. away from the pole tips, it must travel away from the gap for the indicated scale to a point 150 μin. removed from the zero position before minimum recording takes place. This will be found at point 41 on the curve representing such particle prior to the time any permanent magnetization on the tape or record strip can remain after excitation. As the particle moves further away from the gap, the field becomes weaker, as already explained. The field nonetheless is capable of producing a permanent magnetization of the record strip medium or tape even though the assumed particle moves further away from the gap unless the field strength becomes less than about 225 oersteds. As can be seen from the curve for a particle 2 μin. away from the core, the magnetic field strength does not decrease to a value of 225 oersteds until the particle reaches point 42, which is shown as being approximately 200 μin. from the gap. Consideration of this showing makes evident the fact that the high frequency definition is limited by the rate of change or the gradient of particles which are close to the core. In the example cited, and as represented by the referenced curve, the regions along the tape that can be affected by a high frequency signal are ones having a physical length of 50 μin. (that is, the difference in microinches between point 41 and point 42 where the magnetic state is first retained and where the magnetic state is unaffected). It will be appreciated also that the distance between points 41 and 42 along a path parallel to the core and along the path of tape motion will be substantially independent of the gap width. It means that wave lengths of 50 μin. and shorter cannot be resolved in the reading process and, as a matter of fact, the output for the example chosen for a 50 μin. wave length would be zero.

Considering the described apparatus for high frequencies, the particles close to the head are those which need be given primary and serious consideration. This is because particles further from the gap have only a minor effect on the reading process. As an example, at 100 μin. separation from the core, had the extreme frequencies or short wave lengths in the high resolution head been significant, it is evident that these would have virtually no effect upon the reading process.

If now the effect of the cross-field as developed by the pole piece 29 or 29', for instance, is to be considered, it will be apparent that if the cross-field is arranged so that it subtracts from the magnetic field created by the record-head gap between the pole tips 14 and 15, the definition of all of the particles and particularly those that contribute to the high frequency definition is important.

By making further reference particularly to FIG. 5 of the drawing, a cross-field developed from the cores 29 or 29' which is opposite in polarity to the polarity from the record-head gap at the pole tip 15 (that is, the pole tip last traversed by the recording medium) at the surface of the core is arranged so that it subtracts from or bucks out the primary record-head gap field to the extent that it subtracts 225 oersteds from the record-head gap field. To depict this condition, reference may be made to the state of ordinates shown to the right of FIG. 5 along its margin which depicts the effective field strength resolution from the record-head gap and the cross-field core measured in oersteds. For these conditions, the distance measurements parallel to the core along the tape path remain as the abscissa values but the ordinate coordinate is read from a zero value at a position corresponding to 225 oersteds when considering the scale on the left ordinate position of the figure.

Considering FIG. 5 in this light, the resulting field strength of particles close to the core at a distance of 2 μin. falls through the region between 300 and 225 oersteds between the points 43 and 44 on the curve. Here, it will be noted that these points represent distances respectively of 86 μin. and 100 μin. from the gap. This means that wave lengths of the order of 14 μin. will have zero output but longer wave lengths may be resolved. This shows an improvement of approximately 3½:1 over the previous example. It indicates also the pattern achieved through the operation and the development of the cross-field effect as from the FIG. 1 to FIG. 4 structure. The overall net result is that the recordings occur closer to the gap after the tape or record strip is passed over the gap. At the same time the zone over which the recording occurs is reduced to about 28% of that where the cross-field is not applied.

By the drawings, the adjustment features for the positioning of the gap between the pole tips 14 and 15, as well as the positioning and bringing into parallelism of the cross-field pole piece 29 may vary. The significant factor is that because all components are generally separate from each other without directly affecting the other it is therefore possible to achieve by an extremely simple structure a precision in fidelity of recording not heretofore had, as can be seen from the FIG. 8 structure.

Still making reference to the curves of FIG. 5, it is apparent that the magnetic field strength is plotted in oersteds against the distance along the magnetic core from the gap center. The ordinate values on the left side of the curve represent the magnetic field strength without the application of any cross-field. The ordinate values along the right side of the curve represent the resulting magnetic field strength in oersteds derived from the gap field having a cross-field also applied therewith. The lower curve represents the field strength at a distance 100 μin. above the core and the upper curve represents the field at 2 μin. above the core.

The curves of FIG. 5, as will be appreciated, are representative of only one-half of the complete conditions obtaining since, as is recognized in the art, the curves actually should extend to the left of the center line of the gap, as well as to the right thereof, assuming the direction of tape or record medium travel is from left to right, looking at the curves. The fields to the left of the center line of the gap are omitted in the curves because they become of no significance due to the fact that as any particle on the recording medium passes directly over the gap between the pole pieces, it experiences a field which is sufficiently strong to reverse all of the particles, regardless of what had previously happened. Because of this fact, recording can occur only to the right of the gap, again assuming the recording tape medium travels left to right, as indicated.

The magnetic field strength indicated by the lower curve at a distance of 100 μin. from the gap should be considered only in accordance with the field strength designations on the left ordinate as contrasted with the right ordinate. The lower curve representing the field strength at 100 μin. is representative of a condition where no cross-field is applied and, as already stated, should be interpreted relative to the left-side ordinate. The right ordinate value is obtained by merely making a scaler subtraction of 225 oersteds from the left-hand ordinate. The stated condition would not apply to the fields 2 μin. from the surface of the recording medium since, at this distance from the core, the field from the main recording gap is, for all practical purposes, precisely vertical to the core, and the cross-field is also exactly vertical but has a reverse phase so that it subtracts. Therefore, at the assumed distance of 2 μin. above the core, the plot of the field is accurate for both ordinates.

Although high frequency recording takes place throughout the thickness of the storage media, only the stored information relatively close to the surface of the medium is of significant importance. This is because on read-out, during the playback process, information recorded at relatively great distances from the surface of the storage medium has little or no effect in producing flux at the gap. Consequently, at high frequencies, where the cross-field principle contributes the greatest improvement, it is basically only essential to examine what happens to the recording process and the subsequent playback process for particles in the storage medium close to its surface and, therefore, close to the magnetic core. It is this condition which is depicted in the curves of FIG. 5 for that shown at 2 μin. above the core.

In the event that no cross-field is applied, the ordinate values to the left of the curves should be considered, in which case, a particle that is separated from the core by the assumed 2 μin. and which particle travels from left to right, as the curves are viewed, first experiences an increasing magnetic field until the particle crosses the gap. Then, as shown by the curves, as soon as the particle is 50 μin. to the right of the gap center line, the magnetic field strength effective on it is shown as 900 oersteds. Each cycle of bias reverses the polarity of the particle. As the particle moves further away from the gap, the magnetic field effective on it is reduced and, finally, as already stated, reaches at value of 300 oersteds at point 41 when the particle is 150 μin. to the right of the gap. Operation of recording devices has shown that the level of magnetic field between 300 oersteds and 225 oersteds is all that is required to reverse the polarity of the magnetic storage media and that at some particular accritical point in the area of an individual magnetic domain, the polarity that the medium is last exposed to is retained, provided that the next exposure is below the critical lower magnetic level. Under the circumstances, the recording occurs for the entire media during the passage of that media through a magnetic field which has a strength in the range between 300 and 225 oersteds for the same particle.

The upper curve of FIG. 5 indicates this condition and shows that as the particle passes for a horizontal travel range shown by the designation A on FIG. 5, the limiting range of 225 oersteds at point 42 is finally reached. This occurs, as can be seen, at 200 μin. from the gap center. Consequently, the spacing of 50 μin. between points 41 and 42 is a serious limitation on the amount of definition that can be recorded in the medium. This is because at wave lengths approximating 50 μin., those values will not be recorded at the same strength as, for instance, a wave length that is eight to ten times as great.

It is for these reasons that it is desrable to reduce the length or distance of travel which corresponds to conditions for particles close to the core. This condition is achieved by practicing the invention of the present application through the inclusion of a cross-field biasing effect or the type here described. This cross-field biasing effect interferes with or bucks out or cancels the field created by the main recording gap head. As already explained, this can be depicted by the upper curve of FIG. 5 when the axis is offset according to the practice already described in connection with the right-hand ordinate of of the curve where the zero level for a magnetic field strength of 225 oersteds represents a starting position. Considering the upper curve of FIG. 5 and particularly in relation to the right-hand ordinate value, a particle 2 μin. from the gap will travel a distance between a condition where the field strength is 300 oersteds and one where the field strength is 225 oersteds which is represented by the length of the line B which is shown as 14 μin. This represents a comparison with the 50 μin. with no cross-field present of approximately 3½:1. This should, on a theoretical basis, make the combination have a response characteristic considered on an input-output basis of 3½:1.

The optimum of theoretical value is likely not achieved for a variety of reasons. First of all, the value is related to the recording process. As the recording frequency is increased, the separation loss becomes greater since the wave length is smaller although all of the losses which are normally expected to be associated with the pick-up head are greater. For this reason, reference may be made to the conditions of operation shown particularly by FIG. 6. The curves of FIGS. 5 and 6 are taken on the same recording head with and without cross-field bias being applied. Therefore, these showings can be regarded as intimately related to each other.

If reference is made to the curves of FIG. 6, it can be assumed that the tape speed is chosen illustratively at 30 inches per second across the recording gap. Considering the lower curve, at an output level of −40 db with no cross-field bias applied, the highest frequency obtainable is approximately 320 kc. Considering the condition with the application of cross-field biasing as described in connection with FIGS. 1 or 4, for instance, the output level for a condition of −40 db is shown approximately at 660 kc. This provides an improvement in excess of 2:1.

From the showing of FIG. 5, it could have been expected that the improvement resulting from cross-field bias should have been approximately 3½:1. What may seem to be a disparity between the showings of the curves of FIGS. 5 and 6 is believed, from investigation, to have resulted from the fact that constant current recording does not always produce a constant flux in the gap at higher frequencies. This is because the shunt capacity associated with the windings on the recording head has some effect. Further, for the stated condition, losses may occur in the head core material itself. Under the circumstances, the indicated improvement shown by FIG. 6 being slightly of an excess of 2:1 is extremely significant considered in the light of all of the limitations on the magnetic record/play process and a very great improvement.

Reference may now be made to the curve of FIG. 6. In this figure, curves A and B are shown which represent frequency characteristics taken from the same head structure with and without cross-field biasing. It will be noted that these curves demonstrate the marked and significant improvement achieved through the use of cross-field biasing although the curves are essentially identical in the lower frequency range below about 12.0 to 13.0 kc. The output voltages result from an assumed input signal of constant current applied as a signal frequency to a head which is intended to provide equal magnetization at all frequencies. At an output level of −40 db, it may be noted that the output in the region of higher frequencies with no cross-field is approximately 320 kc. This is represented at point 71 where the lower curve A crosses the −40 db line. On the other hand, if cross-biasing is applied, as explained particularly in connection with the head structures of FIGS. 1 through 4, for instance, and the operative characteristics as diagrammed by the curves of FIG. 5 are considered, there is shown a response at point 73 in curve B which is representative of about 660 kc. This represents, as can be seen, an improvement slightly in excess of 2:1 which is somewhat in contrast with the improvement of about 3½:1 diagrammed with respect to the curves of FIG. 5. However, the condition is not unrealistic because for conditions where constant current recording takes place, as in the described example, a constant flux is not always produced at the gap at the higher frequencies. This is because there is some capacity effect associated with the various windings on the head and also, because at higher frequencies, there is some loss in the head core material itself. However, the improvement depicted by FIG. 6 nevertheless shows something in excess of 2:1 which is considered of substantial significance in the field under consideration.

FIG. 7 is an isometric view of a head structure generally similar to that shown by FIG. 4. It represents on a much enlarged scale a magnetic head structure formed in laminated fashion so as to represent other than a view in a single plane, with a cross-field pole arrangement immediately above the gap as in FIG. 4 with the magnetic tape or record medium adapted to be drawn therebetween. In normal operation, the tape or record medium rides directly over the head structure and across the gap and the cross-field pole, as already explained.

Referring to FIG. 8 there is shown a multiplicity of head structures of the type generally discussed in connection with FIG. 7 in particular in close association with each other. The FIG. 8 exploded view shows a multiplicity of independent heads positioned adjacent to each other with a magnetic separating and shielding element between adjacent heads. As the invention has been illustrated by FIG. 8, four separate head structures are shown, although this is purely for illustration and not in a limiting sense. In many operations, the number of such head structures within the bounds of the holder may be of a greater number, such as ten, for instance, if more record tracks are desired.

FIG. 9 illustrates schematically one form of multiple record strip providing eight separate tracks or recording strips. It may be noted that as the record strip is depicted, strips 1, 2, 3 and 4 are interleaved with record strips 5, 6, 7 and 8 with a spacing therebetween, as shown at 81, for the several cases. Normally, in recording and reproducing records having multiple tracks, it is customary to record tracks, such as 1, 2, 3, and 4 while the tape is moving in one direction relative to the head structure. Then, subsequently the remaining tracks 5, 6, 7 and 8 are recorded while the tape or record strip is moving in the opposite direction, also relative to the recording heads. Various generally similar arrangements, of course, may be utilized.

By one pattern of recording, and purely as illustration of the possibilities of the system, if it be assumed that the magnetic record strip or tape upon which the recordings are to be made is approximately 0.250 inches wide (this is the standard one-quarter inch tape) and if ten record tracks or strips are to developed, each recorded track may be of a width of about 0.016 inch and each recorded track region then may be separated from its next adjacent recorded area by a blank separation of a width of approximately 0.009 inch. The tracks nearest the edge of the record strip or tape have an edge clearance of about 0.0025 inch to 0.0035 inch. This then provides that there may be slight tolerances in the tape or strip width without having any adverse effect on the operation.

Where the separate record strips chosen are of a number such as that shown by FIG. 9 then, of course, each record strip or track may be slightly wider than above suggested, (assuming one-quarter inch tape is used) and, if desired, also, the spacing strip may be slightly wider, although this is not usually necessary. Wide choice is available as to the number of separate tracks desired and the width and separation of the several tracks. For television recording and particularly for extremely high fidelity reproduction where the sound or audio information is to accompany the video information on the same tape strip and where, for instance, information covering synchronization and control signal information may be regarded as a separate record, it is often desirable to have a larger number of separate records. The precise manner of allocating particular frequency ranges to each strip or track width is not the specific subject matter of this invention and, accordingly, it will be understood that many and various ways of deriving signals within the individual frequency bands may be selected.

Reverting now again to FIG. 8 and for a type of recording where four separate records are produced in each direction (see also FIG. 9) the separate recording heads schematically designated 101, 102, 103 and 104 may be assumed respectively to record the message on the regions 1, 2, 3 and 4 of the magnetic record strip of FIG. 9. In making such assumptions, the record strip 20 may be considered to travel from left to right across the gap provided by the tips of the pole pieces (such as 14 and 15 of FIG. 1) approaching each other. The separate poles, as in FIG. 8, are formed as a nested assembly with the windings 27 and 28 as in FIG. 1 or FIG. 4 in aiding relationship, as already noted and connected so as to provide along with the signal information the proper biasing as already explained. The adjacent heads are separated from each other by non-magnetic spacer elements 107 which extend slightly beyond the lateral edges of each head thereby to shield the elements one from the other. The assembly is customarily placed within a holder or housing structure conventionally represented at 112. The heads 101 through 104 and the non-magnetic separating elements protrude through appropriate openings or slots in the housing structure. The magnetic tape, such as that designated by FIG. 9, is transported across the complete group of heads in any desired manner permitting precise alignment with respect to the particular head contact maintained. A cross-field is provided by the cross-field pole 115 which is carried within a cover arrangement adapted to fit over the head assembly. The cross-field pole 115 has a winding 117, generally analogous to the winding 31 for the pole 29 as shown by FIG. 1.

The cross-field pole 115 is formed to conform generally to the pole formation shown by FIG. 1. The cross-field pole assembly is then separated from the main assembly 112 by means of three appropriate adjusting screws 125 which are adapted to thread through openings 126 in the cover 127 and to seat in the cupped holes 128 of the holder for the multiple head. The provision of three separate fastening bolts 125 at the indicated three separate positions on the cover holder affords an opportunity for adjusting the cross-field pole 115 with respect to the other head structures 101 through 104 thereby to provide the magnetic cross-field in a direction precisely perpendicular to the gap in each of the recording heads, in the fashion already explained and adjustable in three-dimensions. It was also pointed out that it is important to provide the cross-field in such a way that suitable adjustment can be made from time to time whereby the effective direction of the field relative to the recording field may be established.

The top structure 127 of FIG. 8 provides for the return path from the cross-field head 115 to be derived through the return path poles 135 and 136 which are on the same side of the magnetic record strip (not shown in FIG. 8) as is the cross-field pole 115. If desired, the cover structure 127 may be modified in accordance with the modification of FIG. 4 so that the return may be via the air path as already explained.

Referring now to FIG. 10, for a further showing of the assembly of a plurality of head structures, such as shown by the assembly in FIG. 8, the various elements are shown in accordance with the numbering in FIGS. 1 and 8, with different head structures designated by prime, double prime or similar numbering. The different heads, as already explained in connection with FIG. 8, are separated by the magnetic spacers or shields 107, 107′ and 107″. The various components are assembled in the main housing 112 in appropriately located slots with adhesives. This eliminates the need of bolt holes through the lamination and thus offers some magnetic improvement.

In the foregoing description, no specific mention has been made to particular tape or record strip speed of movement relative to the individual or multiplicity of adjacently positioned magnetic heads. It is to be understood that wide latitude exists in selecting the appropriate speed of record strip or tape movement. One speed which is vary frequently used and for which the described apparatus is particularly suited is approximately thirty inches per second of tape movement transported and driven by any appropriately selected constant speed tape drive. Many such tape drives are known in the art and, therefore, have not been specifically set forth herein.

The recording range, as was made evident from the description above, is determined by the space in the tape over which recording of any particular frequency can take place. The frequency range in the case of television signals is normally such that the overall composite signal must be segregated to different tape sections. To achieve this result, appropriate filtering systems to select for each individual transducer head may be provided, as is also recognized in the art. Illustratively, but not in a limiting sense, if it be assumed that for any relatively wide band of signal frequencies selected for recording, and with an appropriate tape speed for the desired response frequency, the selection might be made according to a plan whereby the lowest frequency range would be selected as the output of a low-pass filter, the highest frequency range selected as the output of a high-pass filter and a middle frequency range then selected by that portion of the frequency band which is excluded by the low-pass and the high-pass filters or that portion of the frequency band which might be selected by a band-pass filter. The precise form of selection, again, is not material to the nature of this application but it is mentioned in view of the fact that the invention here described encompasses in some forms more than a single pair of pole pieces arranged adjacent to each other for the overall signal to be reproduced. All forms of the invention, as is apparent from what has been stated, comprise the use of an additional pole piece to create the cross-field in combination with the signal field developed.

Many and other modifications, of course, will become apparent to those skilled in the art to which the invention is directed when the appended claims are read in connection with this description and the accompanying drawings.

Having now described the invention, what is claimed is:

1. An electromagnetic transducer head comprising a plurality of pairs of pole pieces each having poles facing each other in closely spaced relationship and separated from each other by a non-magnetic gap, means for supporting the plurality of pairs adjacent to each other with the gaps aligned and the pairs separated by a non-magnetic layer, all of said poles and gap being adapted to have a magnetic record member transported thereacross, means for producing an electromagnetic field consisting of a different signal frequency and a like biasing frequency in the region of the gap between each of the closely spaced poles, a cross-field pole supported by 3-point support means substantially adjacent to the aligned gaps of all of the pole pairs, the said third pole extending across all of the gaps with sufficient spacing therebetween to permit the magnetic record member to be moved across all pairs of pole pieces and between said pole pieces and said cross-field pole, means provided by said cross-field pole for creating a cross magnetic field independent of the field developed between the facing poles by applied signals and high frequency bias, and means to adjust the position of the cross-field pole so that the cross field developed shall be effective at each of the pairs of pole pieces to provide a subtractive relationship relative to the field between the said facing pole pieces which is effective as the transported record member passes beyond the second pole piece of each pair so that the region over which a recording field of strength to which the magnetic record member is sensitive is narrowed and an improved resolution of recording results.

References Cited

UNITED STATES PATENTS

| | | | |
|---|---|---|---|
| 2,628,285 | 2/1953 | Camras | 179—100.2 |
| 2,915,812 | 12/1959 | Rettinger | 179—100.2 |
| 2,932,697 | 4/1960 | Bogen et al. | 179—100.2 |

FOREIGN PATENTS

| | | |
|---|---|---|
| 379,147 | 6/1964 | Switzerland. |

BERNARD KONICK, Primary Examiner

J. RUSSELL GOUDEAU, Assistant Examiner

U.S. Cl. X.R.

340—174.1; 346—74